(12) United States Patent
Anderson et al.

(10) Patent No.: US 7,774,364 B2
(45) Date of Patent: Aug. 10, 2010

(54) UNIFORM NAME SPACE REFERRALS WITH LOCATION INDEPENDENCE

(75) Inventors: Owen T. Anderson, Chapel Hill, NC (US); Craig F. Everhart, Pittsburgh, PA (US); Boaz Shmueli, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 11/076,235

(22) Filed: Mar. 9, 2005

(65) Prior Publication Data
US 2005/0149528 A1 Jul. 7, 2005

Related U.S. Application Data

(63) Continuation of application No. 10/208,439, filed on Jul. 30, 2002, now Pat. No. 6,947,940.

(51) Int. Cl.
*G06F 17/30* (2006.01)
(52) U.S. Cl. .................. 707/782; 707/781; 709/204; 709/227
(58) Field of Classification Search ............ 707/1–10, 707/203; 709/201–244
See application file for complete search history.

(56) References Cited

U.S. PATENT DOCUMENTS

| 5,708,832 | A | * | 1/1998 | Inniss et al. ............... 709/229 |
| 5,778,384 | A |   | 7/1998 | Provino et al. |
| 5,832,527 | A | * | 11/1998 | Kawaguchi ............... 707/205 |
| 5,915,096 | A |   | 6/1999 | Rosenzweig et al. |
| 5,946,685 | A |   | 8/1999 | Cramer et al. |
| 6,052,785 | A | * | 4/2000 | Lin et al. ................. 726/5 |
| 6,065,043 | A | * | 5/2000 | Domenikos et al. ......... 709/203 |
| 6,163,806 | A |   | 12/2000 | Viswanathan et al. |
| 6,321,219 | B1 |   | 11/2001 | Gainer et al. |
| 6,324,581 | B1 | * | 11/2001 | Xu et al. ................. 709/229 |
| 6,374,268 | B1 | * | 4/2002 | Testardi ................. 707/205 |

(Continued)

OTHER PUBLICATIONS

Braam, Peter J., and Lee Ward, "Global Namespaces for File Systems", 2002, May 30, 2002, <http://www.lustre.org/docs/namespace.html>. pp. 1-11, (11 pages).

(Continued)

*Primary Examiner*—Tim T. Vo
*Assistant Examiner*—Michelle Owyang
(74) *Attorney, Agent, or Firm*—Marcia L. Doubet

(57) ABSTRACT

Improved techniques are disclosed for accessing content in file systems, allowing file system clients to realize advantages of file system referrals even though a file access protocol used by the client is not specifically adapted for referral objects. (For example, the client may have a legacy file system protocol or a proprietary file system protocol which does not support referrals.) These advantages include a uniform name space view of content in a network file system, and an ability to locate content in a (nearly) seamless and transparent manner, even though the content may be dynamically moved from one location to another or replicated in different locations. A file system server returns a symbolic link in place of a referral, and an automated file mounting process on the client is leveraged to access the content using the link. Built-in crash recovery techniques of the file system client are leveraged to access moved content.

26 Claims, 14 Drawing Sheets

U.S. PATENT DOCUMENTS

| | | | |
|---|---|---|---|
| 6,388,592 B1 | 5/2002 | Natarajan | |
| 6,453,354 B1 * | 9/2002 | Jiang et al. | 709/229 |
| 6,487,583 B1 | 11/2002 | Harvey et al. | |
| 6,519,629 B2 | 2/2003 | Harvey et al. | |
| 6,532,478 B1 | 3/2003 | Matsubara | |
| 6,615,166 B1 | 9/2003 | Guheen et al. | |
| 6,687,701 B2 * | 2/2004 | Karamanolis et al. | 707/10 |
| 6,795,833 B1 * | 9/2004 | Whipple, II | 707/204 |
| 6,889,249 B2 * | 5/2005 | Miloushev et al. | 709/213 |
| 6,928,442 B2 * | 8/2005 | Farber et al. | 707/10 |
| 6,931,410 B2 * | 8/2005 | Anderson et al. | 707/100 |
| 6,947,940 B2 * | 9/2005 | Anderson et al. | 707/10 |
| 6,968,345 B1 * | 11/2005 | Muhlestein | 707/103 R |
| 7,010,553 B2 * | 3/2006 | Chen et al. | 707/203 |
| 7,089,249 B2 * | 8/2006 | Kobayashi et al. | 707/10 |
| 7,269,664 B2 * | 9/2007 | Hutsch et al. | 709/246 |
| 2003/0158836 A1 * | 8/2003 | Venkatesh et al. | 707/1 |
| 2003/0167296 A1 * | 9/2003 | Todd, II | 709/203 |
| 2004/0024786 A1 * | 2/2004 | Anderson et al. | 707/200 |
| 2005/0010653 A1 * | 1/2005 | McCanne | 709/219 |
| 2005/0262102 A1 * | 11/2005 | Anderson et al. | 707/10 |

OTHER PUBLICATIONS

Crosby, Matthew, "AMD-AutoMount Daemon", Mar. 1997, *Linux Journal*, vol. 1997, Issue 35es, article 4, Specialized Systems Consultants, Inc. Seattle, WA USA, pp. 1-3, (3 pages).

Yu, Bin and Munindar P. Singh, "Emergence of Agent-based Referral Networks", 2002, *ACM Press*, Internal. Conf. on Autonomous agents and multiagent systems, pp. 1268-1269, (2 pages).

Zadok, Erez, "Using the AMD Automounter", Oct. 2003, *Linux Journal*, Specialized Systems Consultants, Inc. Seattle, WA, USA, Issue 114, pp. 1-6, (6 pages).

Owen T. Anderson et al., U.S. Appl. No. 10/208,439, filed Jul. 30, 2002, Office Action, Dec. 8, 2004, 15 pages.

Owen T. Anderson et al., U.S. Appl. No. 10/208,439, filed Jul. 30, 2002, Notice of Allowance, Mar. 28, 2005, 13 pages.

Owen T. Anderson et al., U.S. Appl. No. 10/208,439, filed Jul. 30, 2002, Notice of Allowance, Jul. 27, 2005, 11 pages.

* cited by examiner

FIG. 7

| | File system key | Location and path |
|---|---|---|
| 730 | root.fnas | server1:/export/fs1 |
| 740 | binaries | server2:/export/progs |
| 750 | home | server3:/export/users |
| 760 | u.boaz | server4:/export/boaz |
| 770 | u.craig | server5:/export/craig |
| 780 | u.ted | server6:/export/ted |

*1100* /fnas/u/boaz/file1

*1110* /.uns/root.fnas/u/boaz/file1

*1120* .../u/boaz/file1

*1130* /.uns/home/boaz/file1

*1140* .../boaz/file1

*1150* /.uns/u.boaz/file1

*1160* ...file1

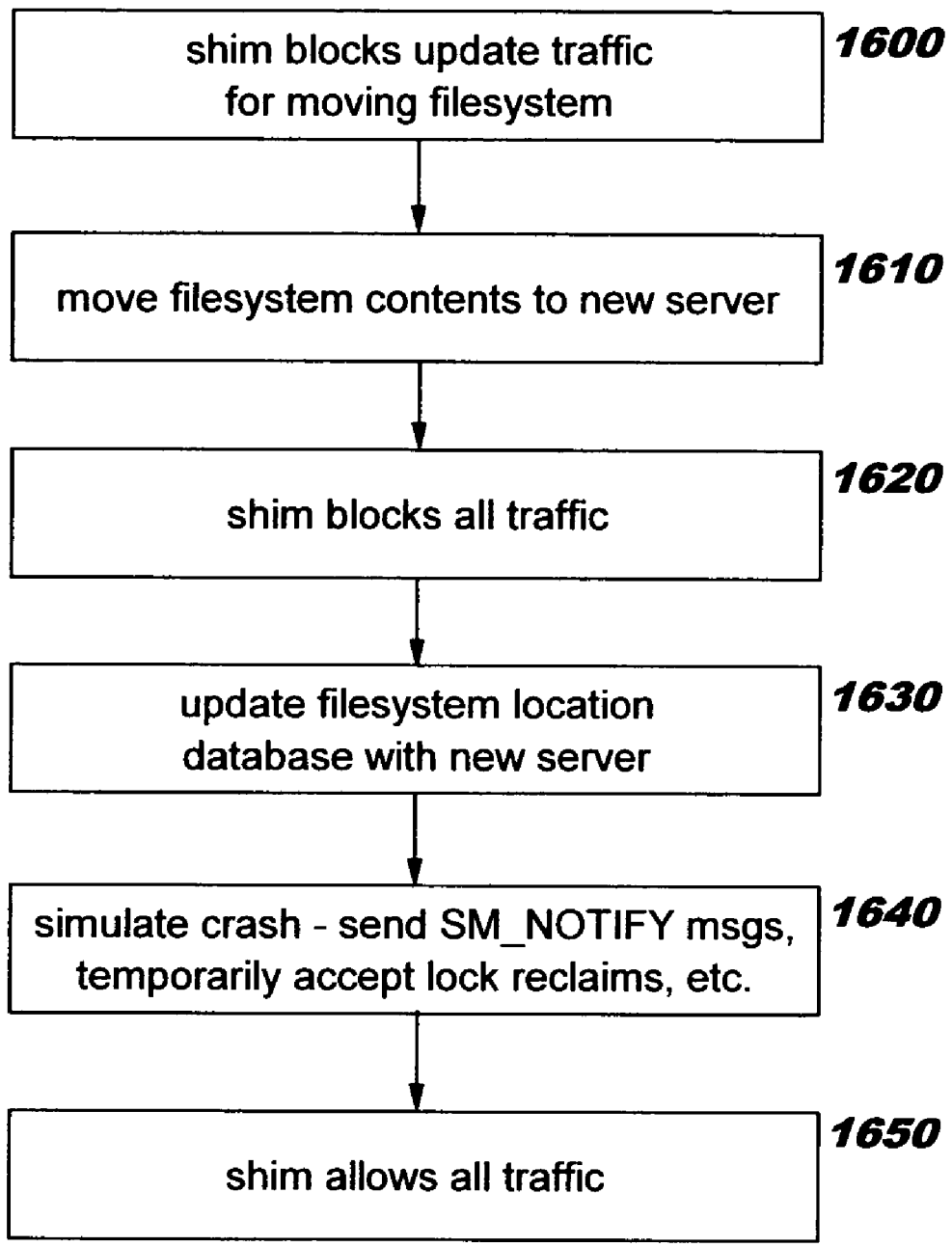

UNIFORM NAME SPACE REFERRALS WITH LOCATION INDEPENDENCE

RELATED INVENTION

The present invention is a Continuation of commonly-assigned U.S. patent application Ser. No. 10/208,439, filed on Jul. 30, 2002 (now U.S. Pat. No. 6,947,940), which is titled "Uniform Name Space Referrals with Location Independence" and which is hereby incorporated herein by reference. The present invention is related to U.S. patent application Ser. No. 10/044,730, filed Jan. 11, 2002, entitled "Method, Apparatus, and Program for Separate Representations of File System Locations from Referring File Systems" (now U.S. Pat. No. 6,931,410). This patent application is commonly assigned to the International Business Machines Corporation ("IBM") and is hereby incorporated herein by reference. Hereinafter, this patent application is referred to as "the related invention".

BACKGROUND OF THE INVENTION

1. Field of the Invention

The present invention relates to file systems, and deals more particularly with techniques for enabling clients to realize advantages of file system referrals, including a uniform name space and an ability to locate content in a (nearly) transparent manner, even though the content may be dynamically moved from one location to another or replicated among locations.

2. Description of the Related Art

The term "file system" generally refers to collections of files and to utilities which can be used to access those files. Distributed file systems, referred to equivalently herein as network file systems, are file systems that may be physically dispersed among a number of different locations. File access protocols are used to communicate between those locations over a communications network, enabling operations to be carried out for the distributed files. File access protocols are designed to allow a client device to access remotely-stored files (or, equivalently, stored objects or other content) as if the files were stored locally (i.e., in one or more repositories that are local to the client device). The server system performs functions such as mapping requests which use the file access protocols into requests to actual storage repositories accessible to the server, or alternatively, returning network location information for requested content that is stored elsewhere.

Example file access protocols include "NFS", "WebNFS", and "CIFS". "NFS" is an abbreviation for "Network File System". "CIFS" is an abbreviation for "Common Internet File System". The NFS protocol was developed by Sun Microsystems, Inc. Version 2 of the NFS protocol is documented in Request For Comments ("RFC") 1094, titled "Network File System" and dated March 1989. A more recent version of the NFS protocol is NFS Version 3, which is documented in RFC 1813, titled "Network File System Version 3" and dated June 1995. (NFS Version 4 is currently under development, and is documented in Internet Draft specification 3010, titled "NFS Version 4 Protocol" and dated November 2001.) "WebNFS" is designed to extend the NFS protocol for use in an Internet environment, and was also developed by Sun Microsystems. CIFS is published as X/Open CAE Specification C209, copies of which are available from X/Open.

When a client device needs to access a remotely-stored file, the client-side implementation of a file access protocol typically queries a server-side implementation for the file. The server-side implementation may perform access control checks to determine whether this client is allowed to access the file, and if so, returns information the client-side implementation can use for the access. Hereinafter, the client-side implementation and server-side implementation will be referred to as the client and server, respectively.

Information specifying the file's location in the distributed file system (e.g., the server on which the file is stored, and the path within that server's storage resources) is used by the client to perform a mount operation for the requested file. A successful "mount" operation makes the file's contents accessible to the client as if stored locally. Information used in performing the mount operation, typically referred to as "mount instructions", may be stored on the client or may be fetched from a network database or directory (e.g., using a directory access protocol such as the Lightweight Directory Access Protocol, or "LDAP", or the Network Information Service, or "NIS").

It is assumed for purposes of discussing the present invention that objects are arranged in a hierarchical tree-like structure, where files are arranged in directories and directories can contain other directories. Access to objects is achieved using path names, where a component of the path name designates a sub-directory in the tree. The path starts at the top of the tree. A common convention uses forward slashes or back slashes to separate sub-directories, and a single slash or backslash at the beginning of the path refers to the top or "root" of the hierarchy. For example, the path "/a/b/C" refers to an object "C" that is in directory "b". Directory "b" is in directory "a", which belongs to the root.

After a mount operation, the mounted file system appears to reside within the hierarchical directory structure that defines the client's local file system, at a location within that hierarchical structure that is referred to as a "mount point". The mount operation allows the hierarchically-structured file systems from multiple sources to be viewed and managed as a single hierarchical tree on a client system.

In some cases, a client will request content directly from the server at which the content is available. However, it may also happen that a client requests content from a server that does not have the content. To handle these latter types of references, individual file systems in a network file system may support referrals to content in other file systems. FIGS. 1A-1D depict examples of such referrals within a network file system. Particularly, with reference to FIG. 1A, file system 106 includes a directory "usr". The "usr" directory includes a reference to file system "foo". When a client queries file system 106 for content stored in file system "foo", the reference will redirect (i.e., "refer") the client to file system 116.

In effect, referrals enable linking together multiple file systems. Referring to FIG. 1B, the referral from file system 106 is replaced for the client application by the root of the referred file system 116 when accessed by the application. A single name space is formed when the replacement is made, including files locally available on the client system as well as files available from file systems 106 and 116.

The reference illustrated in FIG. 1A may be termed a "hard-coded" reference. For various reasons, file content may be moved from one location to another, such as to a new server. (For example, the previously-used server might fail, or content might be redistributed to alleviate performance bottlenecks, space shortages, and so forth.) When hard-coded references are used, the stored location may therefore become obsolete.

The redirection process is illustrated with reference to FIG. 1C, where file system 106 again includes a directory "usr" and the "usr" directory includes a reference to file system "foo". Suppose that file system 106 receives a request for file system "foo", but that "foo" has now moved from file system 116 to file system 126. The hard-coded reference in file system 106 continues to redirect the requester to file system 116. Therefore, file system 116 must include information to redirect the requester to file system 126. To avoid the performance penalty of subsequent references to the now-obsolete location and of processing additional redirections, the hard-coded reference in file system 106 must be changed to indicate the new location of the file content in file system 126.

There may be instances where updating the hard-coded reference in file system 106 is, by itself, insufficient, such that it is necessary to retain the redirection information at file system 116. For example, suppose that a copy of file system 106 has been made, prior to revising the hard-coded reference. This copying process is referred to as "replication", and may be performed for several reasons, including increased reliability, increased throughput, and/or decreased response time. If file system 106 has been replicated, then multiple copies of the now-obsolete hard-coded link may exist. See, for example, FIG. 1D, where file system 106 again includes a hard-coded reference to file system "foo" which was determined, at some point in time, to be available from file system 116. Further suppose that file system 106 is replicated as file system 136 and also as file system 146, each of which then includes its own reference to file system "foo" in file system 116. If the content identified by the reference moves to file system 126, then simply updating the reference stored on file system 106 is insufficient, as file systems 136 and 146 will contain to use the obsolete reference to file system 116. Therefore, file systems 106, 136, and 146 must all be updated (even if the file systems were intended for read-only access) to include information to redirect the client to file system 126 (or the intermediate link between file systems 116 and 126 must be maintained, with its inherent performance penalties). As will be obvious, this situation is not only inefficient, but also has a high likelihood for error. Maintaining an awareness of each moved file system and/or replication of references is not a viable solution because of its administrative burden.

Referring now to FIGS. 2A and 2B, examples of particular file systems that support referrals will be described. The scenario shown in FIG. 2A is illustrative of processing using version 4 of the NFS protocol, referred to hereinafter as "NFSv4". Client 202 requests an object "X" from file system ("FS") server #1 206 (step 1). However, X is a mounted file system which actually exists on FS server #2 216 instead of on FS #1 206. File system server #1 206 is aware of this actual location. NFSv4 requires that each referencing server (i.e., a server which stores a referral to another server) include knowledge of the location and path for each mounted file system in the references returned to its clients. Therefore, FS server #1 206 sends client 202 a redirection message identifying FS server #2 and the path, shown in the example as "/a/b/c/X", which may be used to find X on FS server #2 (step 2). Next, client 202 uses the information received in the redirection message to access /a/b/c/X on server #2 (step 3).

Note that earlier versions of the NFS protocol do not support referrals or redirection, and thus a down-level NFS client (e.g., a client implementing NFS version 2 or 3) does not understand a redirection message.

A server can send a redirection message that redirects the client to the server itself. This may be useful, for example, when a file system object is moved within a server. In addition, a chain of redirection messages may be used, for example, when an object is moved more than once.

As another example, FIG. 2B depicts an example of operation using the Distributed Computing Environment's Distributed File System (hereinafter, "DCE/DFS"), which is another example of a network file system that allows referrals to remote machines. Using DCE/DFS, client 202 requests an object "X" from FS server #1 206 (step 1). As in the scenario shown in FIG. 2A, suppose that X is a mounted file system existing on FS server #2 216. According to the DCE/DFS protocol, FS server #1 206 sends the client an indirection response. Rather than including the actual location of a referred file system, as in the redirection message in FIG. 2A, the indirection message in FIG. 2B includes an indirect file system identifier ("FSID"), referred to in the examples as "Y", that may be used by client 202 to find the file system (step 2). After receiving this indirection message, client 202 requests the location of "Y" from a file system location database, or "FSLDB", 220 (step 3). The FSLDB returns the location of Y, "FS server #2," to client 202 (step 4). Thereafter, client 202 uses the location of FS server #2 to request the object from FS server #2 216 (step 5).

NFSv4 and similar network file systems require that a referring server (such as FS server #1 206) know the correct locations where clients should be redirected, as stated earlier. An obvious implementation of referrals in NFSv4 and similar network file systems is therefore to embed the locations of the referenced file systems directly in the data stored in the referring file system. However, as described above with reference to FIGS. 1C and 1D, hard-coding references has a number of disadvantages. DCE/DFS avoids these disadvantages by storing only an identifier for the target file system in the referencing file system. The referring file system returns this identifier to the client, and the client then uses it to look up the current location for the file system. In another approach, the related invention defines techniques whereby a referring server having a key stored in a referral object uses that key to perform the lookup operation for the client. This referring server may obtain the actual server location and path for the target (i.e., referred) file system from a database, table, or other storage repository, and then returns the result (or, alternatively, the server location and an encoded FSID representation that is sent instead of a path) to the client. The client then uses this information, sending a new file access request to the identified server location.

Some file access protocols do not support referrals or referral objects. For example, neither NFS version 2 nor NFS version 3 support referrals. The advantages of referrals, and in particular the manner in which referrals enable unification of file systems into a global or uniform name space as well as provide for location transparency of referred file systems, are therefore not available to client devices running these older or "legacy" versions of file access protocols. Some protocols which provide referral support use proprietary implementations. Disadvantages of using proprietary software are well known, and include lack of access to source code, potential interoperability limitations, and so forth.

Accordingly, what is needed are techniques for allowing clients to realize the advantages of referral objects even though the file access protocol used by the client is not specifically adapted for referral objects.

SUMMARY OF THE INVENTION

An object of the present invention is to provide improved techniques for accessing content in file systems.

Another object of the present invention is to allow clients to realize the advantages of referrals even though the file access protocol used by the client is not specifically adapted for referral objects.

Yet another object of the present invention is to provide location independence for legacy file system client implementations.

Still another object of the present invention is to capitalize on existing functionality to deliver referral capability to legacy file access clients.

Another object of the present invention is to avoid unmount dependencies caused by nested mounts.

A further object of the present invention is to enable migration and replication of file systems to occur in a nearly transparent manner, without requiring an intervening special-purpose gateway.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for accessing content in file systems. In one aspect, this technique comprises: receiving, at a first location, a request for a file object; determining that the requested file object is stored as a referral to a different location; and returning, as a response to the request, a symbolic reference for the requested file object, where the symbolic reference can be used by a function at a receiver of the response to locate the requested file object. The function at the receiver may be, for example, an automounter or file locating component. The requested file object is typically a file system.

In another aspect, this technique comprises: determining that a hosted file system is to be moved from a first hosting location; preventing updates from being made to the hosted file system, responsive to the determination; moving the hosted file system from the first hosting location to a second hosting location; preventing all access to the hosted file system, responsive to the moving; updating location information to reflect the hosted file system being moved to the second hosting location; simulating a system failure at the first hosting location; and allowing, and programmatically transferring from the first hosting location to the second hosting location, all access requests for the hosted file system after the simulated system failure.

The simulated system failure allows requesters of the hosted file system to automatically access the hosted file system at its updated location information and to continue to access the hosted file system at the second hosting location, and preferably comprises sending messages indicating that a hosting server at the first hosting location has recovered. Optionally, the messages are sent only to systems holding locks on the hosted file system. Preferably, the second hosting location accepts, for a limited time, lock reclaim requests from the requesters following the simulated system failure. Optionally, the limited time is adaptable based on how many requesters are holding locks on the hosted file system.

In yet another aspect, this technique comprises: determining that a replica of hosted file system is to be deleted from a hosting location; preventing all access to the hosted file system replica; deleting the hosted file system replica from the hosting location; updating location information to reflect the deletion of the hosted file system replica from the hosting location; simulating a system failure at the hosting location; and programmatically transferring access requests for the deleted file system replica to another replica of the hosted file system, if another replica exists, after the simulated system failure. The simulated system failure allows requesters of the hosted file system to automatically access the hosted file system at the other replica The programmatic transfer may identify a plurality of replicas of the hosted file system, in order that a selection can be made from the plurality by senders of the access requests.

In still another aspect, this technique comprises: requesting a file object from a first location; receiving, as a response to the request, a symbolic reference for the requested file object, where the symbolic reference was created responsive to a determination that the requested file object is stored as a referral to a different location; and programmatically locating, using function at the receiver, the requested file object using the symbolic reference. The function may be, for example, an automounter, and the technique may further comprise mounting the located file object at the receiver.

In a further aspect, this technique comprises: requesting, by a requester, a hosted file system from a hosting location; receiving, by the requester, notification that the hosting location is recovering from a system outage, wherein the notification was triggered by a simulated system outage because a location of the hosted file system is being changed; automatically issuing a subsequent request for the hosted file system, responsive to receiving the notification; and receiving a response to the subsequent request, wherein the response to the subsequent request allows the requester to dynamically access the hosted file system at the changed location.

The location change may be due to moving the hosted file system from the hosting location to a different hosting location, in which case the response to the subsequent request enables the requester to locate the different hosting location, and the technique may further comprise locating, by the requester, the requested file system at the different hosting location.

The requested file system may be a replica, and the location change may be due to the replica being deleted from the hosting location. In this case, the response to the subsequent request preferably identifies one or more other replicas of the requested file system, and the technique may further comprise locating, by the requester, the requested file system using one of the other replicas of the file system.

Location information may be updated to reflect the hosted file system being moved to the different hosting location or the replica being deleted from the hosting location, respectively.

The present invention may also be used advantageously in methods of doing business, for example by providing improved systems and/or services wherein the content access requests can be serviced in an improved manner. File system servers can respond to requests as disclosed herein, effectively making benefits of referrals available to requesters without placing a dependency on those requesters to support a version of a file access protocol that includes built-in support for referrals. Content can then be located in a nearly transparent manner by legacy clients, even though the content may be moved from one location to another or replicated versions of the content may be deleted. Providers of file system services may offer these advantages to their customers for a competitive edge in the marketplace.

The present invention will now be described with reference to the following drawings, in which like reference numbers denote the same element throughout.

BRIEF DESCRIPTION OF THE DRAWINGS

FIG. 7 illustrates a sample mapping between a referral object key and an actual file system location, according to the prior art;

FIGS. 11 and 12 depict an example of resolving a file access, showing how a prior art automounter is leveraged to expand a reference using the symbolic links of the present invention to provide a client with a referral-style uniform name space view; and FIGS. 13-16 provide flowcharts illustrating operation of preferred embodiments of the present invention.

DESCRIPTION OF PREFERRED EMBODIMENTS

Figure 1A:
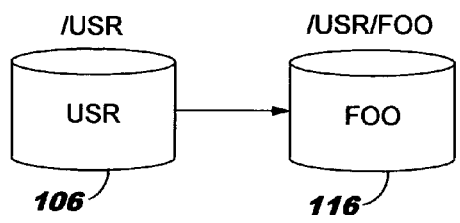
FIGS. 1A-1D are used to describe exemplary network file systems of the prior art.
Figure 1B:
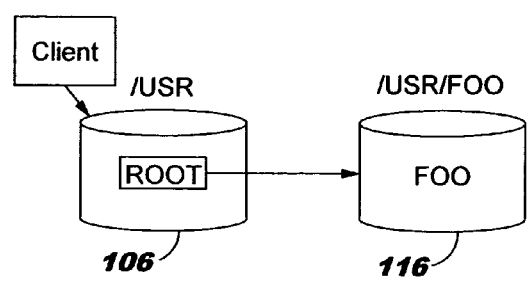
Figure 1C:
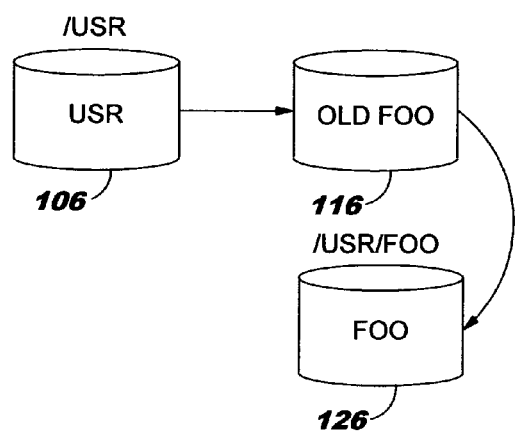
Figure 1D:
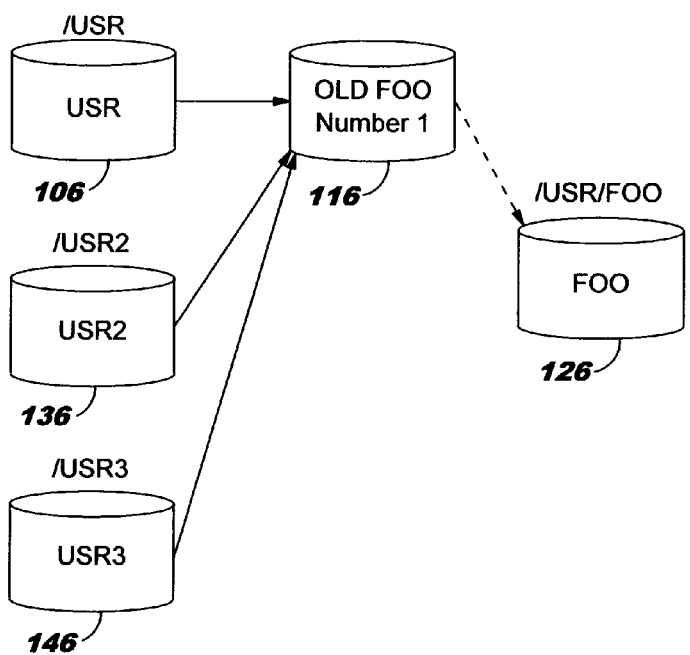
Figure 2A:
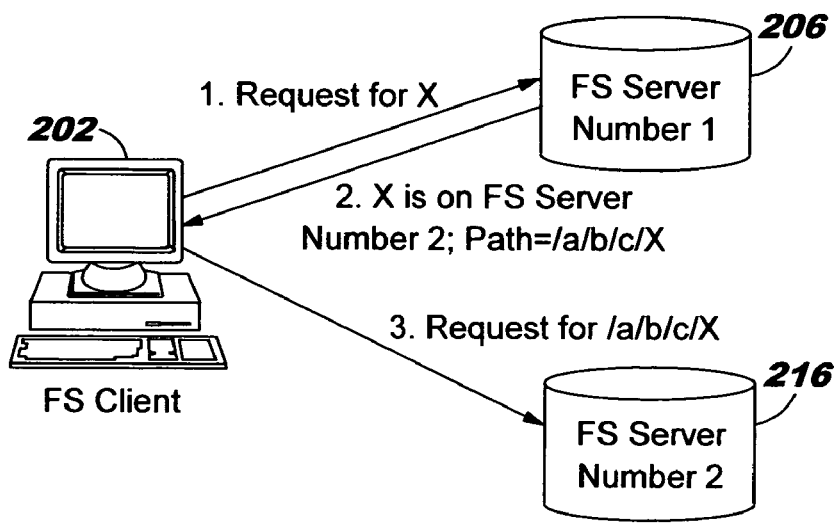
FIGS. 2A and 2B illustrate examples of file systems that allow mounting on remote machines, according to the prior art.
Figure 2B:
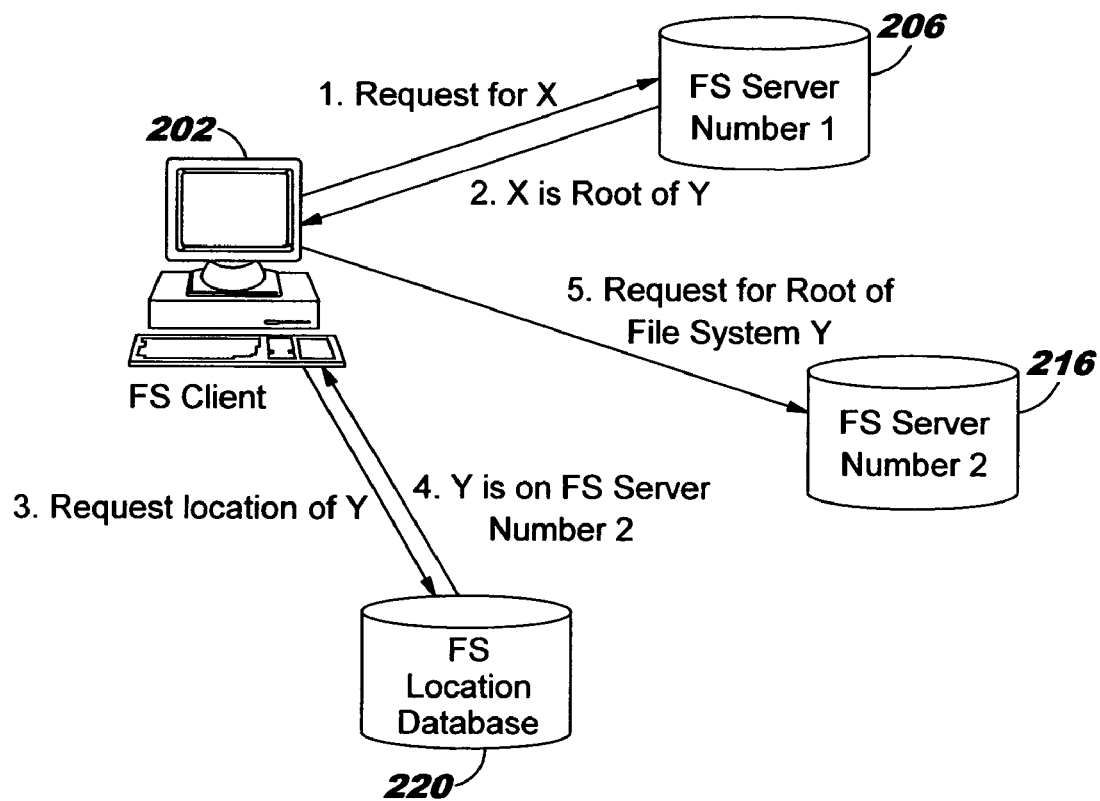

The present invention provides techniques that enable clients to realize the advantages of file system referrals, even though the client does not operate proprietary or complex software that contains support for file system referrals. The disclosed techniques allow clients to achieve a uniform name space view of content in a network file system, and to access content in a nearly seamless and transparent manner, even though the content may be dynamically moved from one location to another or replicated among multiple locations. "Nearly" seamless and transparent, according to preferred embodiments, means that a very small amount of preparatory work is required and that a limited number of dependencies are placed on the client, as will be described; a small amount of additional traffic is also generated.

The disclosed techniques are designed to accommodate legacy clients, but operate in a forward-compatible manner and therefore work equally well with clients having more advanced function and in mixed environments where both legacy clients and advanced-function clients co-exist.

The related invention defines techniques for location-independent referrals, whereby a key (rather than an actual file location) is stored in a referral object and can be used by a server to look up the actual server location and path for the target file system. This allows the referred-to file system to be replicated or moved without requiring updates to referring (i.e., referencing) file systems. These location-independent referrals are designed for use with file access protocols that support referrals, such as NFSv4. The techniques of the present invention, on the other hand, do not require referral support to be built into the file access protocol, and can therefore be used advantageously with legacy clients.

Preferred embodiments of the present invention leverage a client-side function known as an "automounter". Automounters are well known in the art and are commercially available. Examples include the "autofs" product from Sun Microsystems, Inc. and the "amd" product from Berkeley Software Design, Inc. In general, an automounter intercepts client-side file access requests and then queries a client-side repository (such as a configuration file) or a network location (such as a database or directory) to locate the mount information required for the intercepted access request. A mount command is then issued automatically, using the located mount information. Typically, an automounter also automatically issues an unmount command after a predetermined time period expires in which a previously-mounted file system is not accessed.

Automounters provide advantages for client systems, but existing implementations have some functional limitations. First, referrals are not supported. As a result, there is no known way for an object in one file system to serve as a placeholder for the root of another file system. Client systems that rely on automounters are therefore unable to unify multiple file systems into a single, location-independent hierarchy and therefore these client systems are unable to achieve a uniform name space view across file systems. Instead, existing automounters use maps that provide both the name space definition (i.e., what should be mounted when a particular reference is made) and location information (i.e., where that content is physically stored) together. The present invention allows these two types of information (i.e., information used for name space construction and information used to determine a file system's location) to be decoupled, leveraging referral objects that reside in the file system. These referral objects enable linking one file system to another, as illustrated with reference to FIGS. 1A-1D and FIGS. 2A-2B, thereby joining the separate name spaces. However, the referral objects are not presented directly to the client systems, which continue to use prior art automounters to locate file systems on specific servers. Features inherent in the automounter are leveraged, according to the present invention, in a way that simulates a type of client-side file referral capability.

Another limitation of existing automounter implementations is that nested mounts may, in some cases, result in content that cannot be unmounted. For example, a crashed file system may prevent the automatic unmounting of other file systems. This results in inefficient use of system resources, as unreferenced file systems continue to be treated as if they were in active use.

Another limitation of existing automounter implementations is that transparent migration and replication cannot be supported without providing an intervening special-purpose gateway.

The present invention addresses the above-described limitations, enabling clients (and in particular, legacy clients) to realize the benefits of a full-fledged uniform name space with referrals, elimination of unmount dependencies, and provision for (nearly) transparent migration and replication of file systems.

Preferred embodiments place four dependencies on client and server systems. First, the clients must run an automounter (or analogous function). Second, client systems must execute a one-time operation to create a symbolic link for the entry point into the client's automounted file system directory. Third, server implementations are modified slightly to export symbolic links upon encountering a server-side referral object. Finally, a lightweight module is added in the network path in front of file system server code. The performance overhead attributable to the server-side modifications of the third and fourth dependencies is expected to be quite small, as will be seen from the discussions below.

Before describing in detail how preferred embodiments of the present invention operate, a representative environment in which these embodiments may operate will first be described with reference to FIGS. 3-5.

Figure 3:
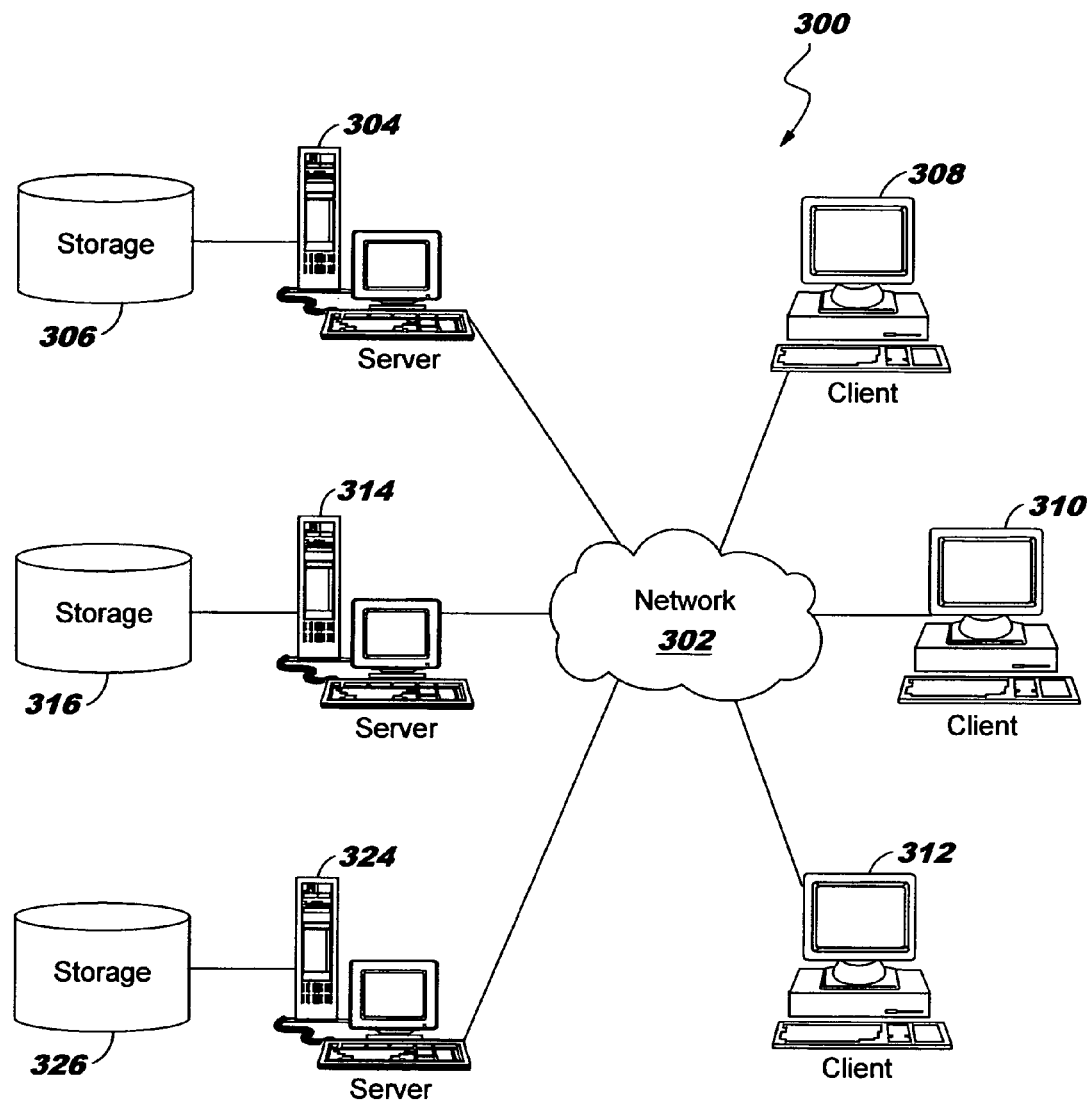
FIG. 3 depicts a pictorial representation of a network of data processing systems in which the present invention may be implemented.

FIG. 3 depicts a pictorial representation of a network of data processing systems in which the present invention may be implemented. Network data processing system 300 comprises a network of computers and/or similar devices and a network 302, which is the medium used to provide communications links between various devices and computers connected together within network data processing system 300. Network 302 may include connections of various types, such as wire, wireless communication links, or fiber optic cables.

In the depicted example, servers 304, 314, 324 are connected to network 302. Servers 304, 314, 324 serve requests for content stored in storage units illustrated by elements 306, 316, 326, respectively. In addition, client devices 308, 310, 312 are connected to network 302. These client devices 308, 310, 312 may be, for example, personal computers or network computers. In the depicted example, servers 304, 314, 316 provide data stored in storage units 306, 316, 326 to clients 308, 310, 312. Clients 308, 310, 312 may each access one or more of the servers 304, 314, 324. Network data processing system 300 may include fewer or additional servers and clients, and may also include other devices not shown in FIG. 3. The devices illustrated in FIG. 3 are well known in the art, and are provided by way of example.

In the depicted example, network 302 may represent the Internet or a number of other types of networks, such as, for example, an intranet, an extranet, a local area network ("LAN"), or a wide area network ("WAN"). It should be understood that FIG. 3 is intended as an example, and not as an architectural limitation for the present invention.

Figure 4:
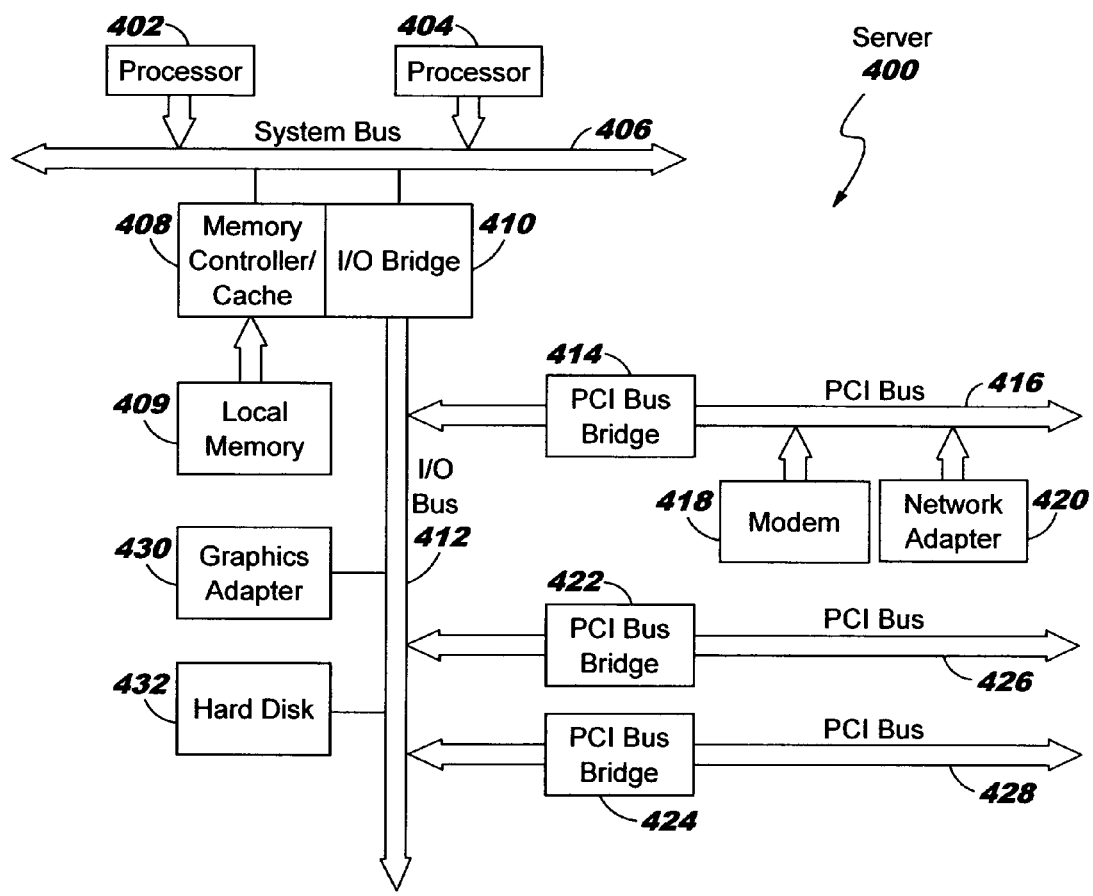
FIG. 4 is a block diagram of a data processing system that may be provided as a server in accordance with preferred embodiments of the present invention.

FIG. 4 is a block diagram of a data processing system 400 that may be provided as a server in accordance with preferred embodiments of the present invention. Data processing system 400 may be implemented as one of the servers 304, 314, 324 in FIG. 3, for example. By way of illustration, data processing system 400 may be a symmetric multiprocessor ("SMP") system including a plurality of processors 402 and 404 connected to system bus 406. Alternatively, a single processor system may be employed. Also connected to system bus 406 in the exemplary data processing system 400 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect ("PCI") bus bridge 414 is connected to I/O bus 412 and provides an interface to PCI local bus 416. A number of modems may be connected to PCI local bus 416. Typical PCI bus implementations will support four PCI expansion slots or add-in connectors. Communications links to network computers 308, 310, 312 in FIG. 3 may be provided through modem 418 and network adapter 420 connected to PCI local bus 416 through add-in boards.

Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM e-Server pSeries™ system, a product of International Business Machines Corporation in Armonk, N.Y., running the Advanced Interactive Executive ("AIX"®) operating system or Linux® operating system. ("pSeries" is a trademark, and "AIX" is a registered trademark, of International Business Machines Corporation in the United States, other countries, or both. "Linux" is a registered trademark of Linus Torvalds in the United States, other countries, or both.)

Figure 5:
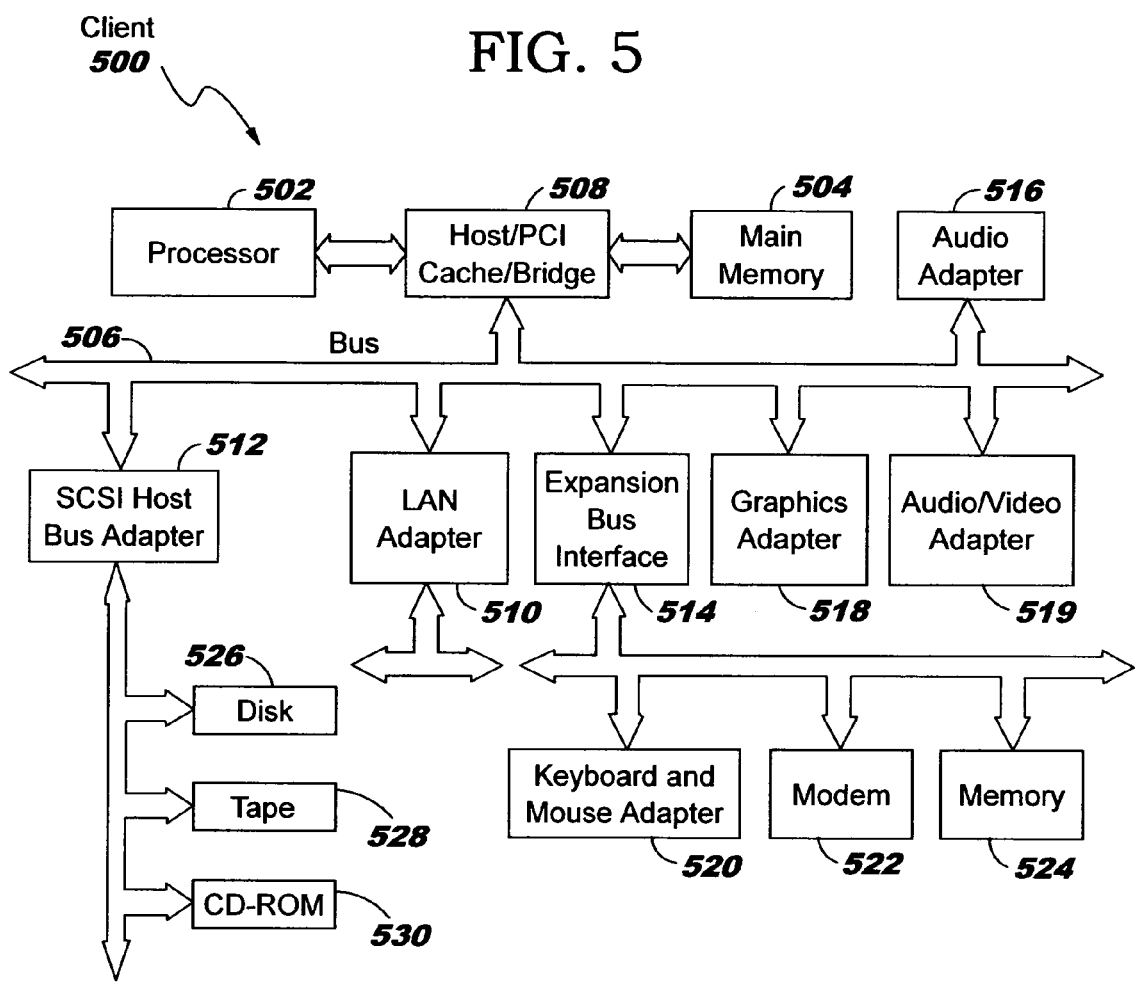
FIG. 5 is a block diagram illustrating a data processing system that may be provided as a client in accordance with preferred embodiments of the present invention.

FIG. 5 is a block diagram illustrating a data processing system 500 that may be provided as a client in accordance with preferred embodiments of the present invention. Data processing system 500 may employ a PCI local bus architecture, or may use other bus architectures such as an Accelerated Graphics Port ("AGP") or Industry Standard Architecture ("ISA") bus architecture. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, LAN adapter 510, small computer system interface ("SCSI") host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 400 in FIG. 4. The operating system may be a commercially available operating system, such as Windows® 2000 from Microsoft Corporation. In some embodiments, an object oriented programming system such as Java™ may run in conjunction with the operating system and provide calls to the operating system from Java programs or applications executing on data processing system 500. ("Windows" is a registered trademark of Microsoft Corporation in the United States, other countries, or both, and "Java" is a trademark of Sun Microsystems, Inc.) Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation, and that FIG. 5 and accompanying descriptions are provided by way of illustration but not of limitation. For example, other internal hardware or peripheral devices, such as flash read-only memory ("ROM") or equivalent non-volatile memory or optical disk drives and the like, may be used in addition to or in place of the hardware depicted in FIG. 5. Also, the processes of the present invention may be applied to a multiprocessor data processing system.

As another example, data processing system 500 may be a stand-alone system configured to be bootable without relying on some type of network communication interface, whether or not data processing system 500 comprises some type of network communication interface. As a further example, data processing system 500 may be a Personal Digital Assistant ("PDA") device, which is configured with ROM and/or flash ROM in order to provide non-volatile memory for storing operating system files and/or user-generated data. Or, data processing system 500 might be a notebook computer or hand held computer, or a device such as a kiosk or a Web appliance.

Returning to FIG. 3, server 304 provides access to storage 306. Similarly, server 314 is depicted as providing access to storage 316 while server 324 provides access to storage 326. Storage 306 may store a first file system that includes a reference (e.g., a referral object) to a second file system stored in storage 316, where this reference serves as a place holder for the second file system using techniques such as those disclosed in the related invention.

Reference is now made to FIGS. 6A-16, which are used to illustrate operation of preferred embodiments of the present invention.

Figure 6A:
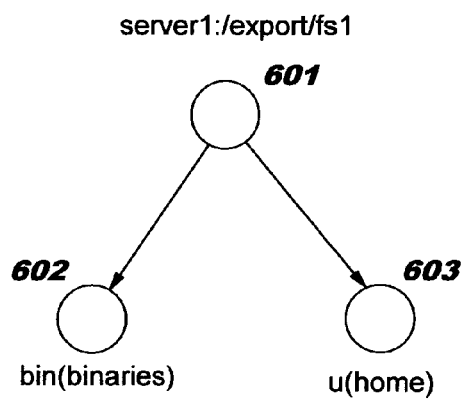
FIGS. 6A-6D depict examples of file systems that are to be exported by a server, where these file systems contain a number of file-system-resident referral objects, according to the prior art.

FIGS. 6A-6D depict examples of file systems that are to be exported by a server (showing the server-side view of the file systems), where these file systems contain a number of file-system resident referral objects, according to the prior art. By way of example, the "server1:/export/fs1/" notation shown in FIG. 6A is intended to signify that server 1 has an export list which includes the file system having "fs1" as its root. This file system contains 3 nodes 601, 602, 603. In the example, node 601 represents a directory, and nodes 602 and 603 represent referral objects stored in that directory.

Referral object 602, which in the example is named "bin", contains a key value of "binaries". According to the mapping shown in row 740 of the sample table 700 of FIG. 7, which contains mappings between referral object keys (column 710) and actual file system locations (column 720) according to the prior art, this "binaries" key value refers to a file system that is currently stored at location "server2:/export/progs"—that is, on server2 as accessed using the path "/export/progs". Thus, sample table 700 provides location information while name space construction information is separately provided (as will be described with reference to server-generated symbolic links). Table 700 is generally representative of an FSLDB of the prior art.

Referral objects may be created, for example, by a person such as a systems administrator or a user having access to the directory in which the referral object is to be stored. The corresponding mappings which are illustrated in table 700 (providing the actual location mapped to each of the referral object keys) may be created/modified by a person such as a systems administrator with proper authority or privileges; alternatively, the mapping information might be programmatically generated, for example in response to files being moved. The value of the key stored in each referral object (and then used for accessing table 700) may be created manually, by hashing, or using other suitable techniques. A file system server, upon receiving a client's request for an object and determining that this object is a referral, will programmatically generate a symbolic link using the key specified in the referral. (The term "symbolic link" is used herein to indicate a symbolic reference from one name to another.) This symbolic link (described in more detail below) will be used by an automounter on the client, according to the present invention, to automatically resolve a mountpoint corresponding to the client's request. So, for example, if the client's request is for "bin" 602, the server will return a symbolic link to "/.uns/ binaries" and the automounter will automatically determine that the request should be resolved by contacting server 2 and requesting the "binaries" file system located in server 2's "/export/progs" directory.

Preferred embodiments also define one special symbolic link, and clients are preferably preconfigured with this special symbolic link, as stated when discussing dependencies of preferred embodiments of the present invention. This special symbolic link may be manually generated or otherwise created on the client, and serves as the entry point into the client's automounted file system directory. The syntax of the special symbolic link may take the form fnas->/.uns/root.fnas where "fnas" is defined as a shorthand reference for the path "/.uns/root.fnas". It should be noted that while this symbolic link is referred to herein as "special", this qualifier refers to a symbolic definition which is relied on for special significance by embodiments of the present invention; the symbolic link itself is an ordinary symbolic link which is processed in the same manner as any other symbolic link. (The ".uns" directory is used, by way of illustration, as the name of the automount directory, as will be discussed in more detail below; "/fnas" is used herein to denote the entry path into the uniform name space, and "root.fnas" denotes the root file system.) Symbolic links, or "symlinks", are known in the art and the expansion thereof is automatically performed by prior art Unix file system implementations. (Note that these prior art expansions occur as local file system constructs, and do not use automounters.) The manner in which a file system server generates symbolic links, according to preferred embodiments, is described in more detail below.

Referring again to FIG. 6A, referral object 603 is named "u" and contains a key value of "home". Requests for object "u" will therefore be handled by generating a symbolic link to "/.uns/home", and row 750 of table 700 indicates that these requests are to be resolved using content stored at location "server3" and accessed using the path "export/users".

Figure 6B:
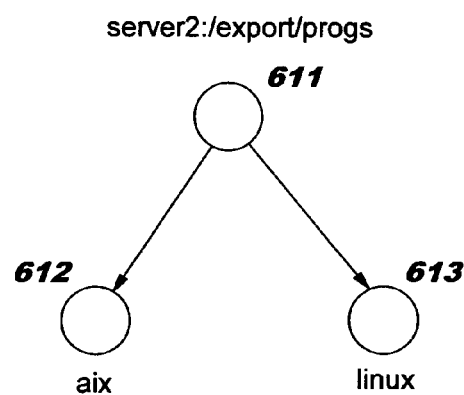

The file system exported by server 2 is shown in FIG. 6B, and also includes 3 nodes. In this example, none of the nodes is a referral object. Instead, node 611 represents a directory "progs", and nodes 612 and 613 represent objects "aix" and "linux" which are stored in that directory.

Figure 6C:
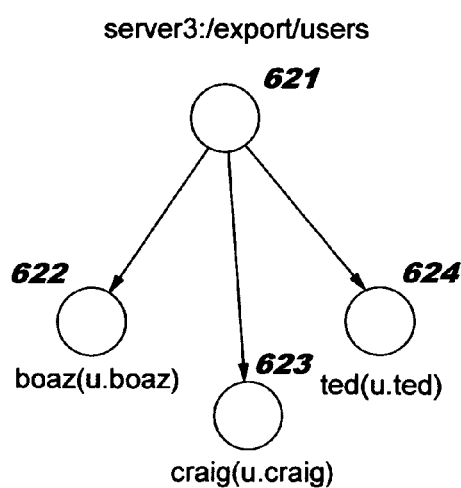

FIG. 6C shows the file system exported by server 3. In this example, the root directory "users" 621 is exported, and this directory contains 3 child nodes 622, 623, 624. Each of the child nodes is a referral object, in the example. The referral object named "boaz" 622 stores as its value the key "u.boaz". Similarly, the objects named "craig" 623 and "ted" 624 store as their values the keys "u.craig" and "u.ted", respectively.

Figure 6D:
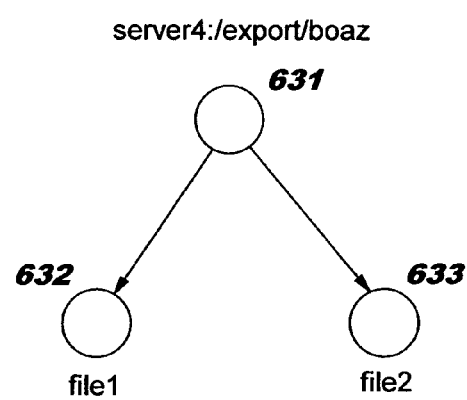

Turning once more to FIG. 7, row 760 specifies that the key value "u.boaz" is to be resolved using content stored on server 4 using path "/export/boaz". Similarly, rows 770 and 780 specify that the key values "u.craig" and "u.ted" are to be resolved using content stored on server5 using path "/export/ craig" and on server6 using path "/export/ted", respectively. (File system layouts for server5 and server6 have not been illustrated.) Finally, FIG. 6D shows the file system exported by server 4. The root directory "boaz" 631 is to be exported, including its child nodes "file1" 632 and "file2" 633. In the example, this file system does not contain referral objects.

Figure 8:
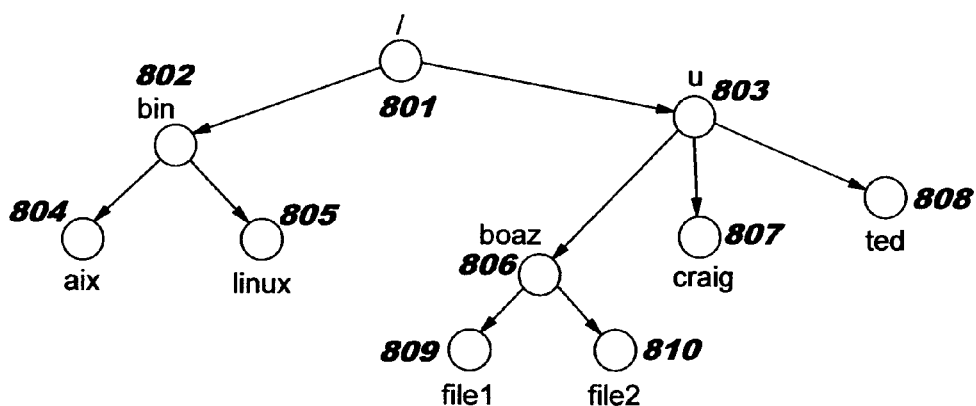
FIG. 8 shows a desired client view resulting from linking the file systems in FIGS. 6A-6D, according to the referral objects and the mapping information in FIG. 7.

Turning now to FIG. 8, the desired client view resulting from linking the file systems in FIGS. 6A-6D (using the file-system-resident referral objects and the corresponding mapping information in FIG. 7) is shown. The hierarchical tree of the client's view begins with an unnamed root node 801 represented by the special character "/", which has two child nodes 802, 803. These three nodes correspond to the file system exported by server 1; see FIG. 6A. Referral object 602 has been expanded, and is therefore replaced (by following the location reference provided in row 740 of table 700) with the file system located on server 2 in the "/export/progs" path. Accordingly, root node 611 will replace node 602 (see 802), and the child nodes 612, 613 will be included as children of that mount point (see 804, 805).

Similarly, the expansion of referral object 603, according to the mapping in row 750 of table 700, replaces that node with root node 621 from server 3's exported file system (see FIG. 6C), and includes node 621's child nodes. See 803, 806, 807, 808. Since these child nodes are themselves referral objects, each will be further expanded. Thus, according to the mapping in row 760 of table 700, node 622 is replaced by root node 631 and its child nodes 632, 633 (see FIG. 6D). See 809, 810. (In an actual implementation, the referral objects 807, 808 would be further expanded according to the mappings in rows 760 and 770 of table 700, although this has not been illustrated in the examples.)

By leveraging referral objects, implementations of the present invention provide location-independent and client-independent views of a uniform name space. Because these referral objects are stored in the file system, each client system will see the same resulting view, with the mount points appearing at the same place and referring to the same place. According to preferred embodiments, this is achieved without requiring a database of mount points to be managed on each client. Instead, each client that makes use of the present invention defines a designated directory (referred to herein as the "/.uns" directory, for purposes of illustration) into which the client-side automounter will put the mount points when they are resolved by the automounter's "on demand" mounting function.

Figure 9:
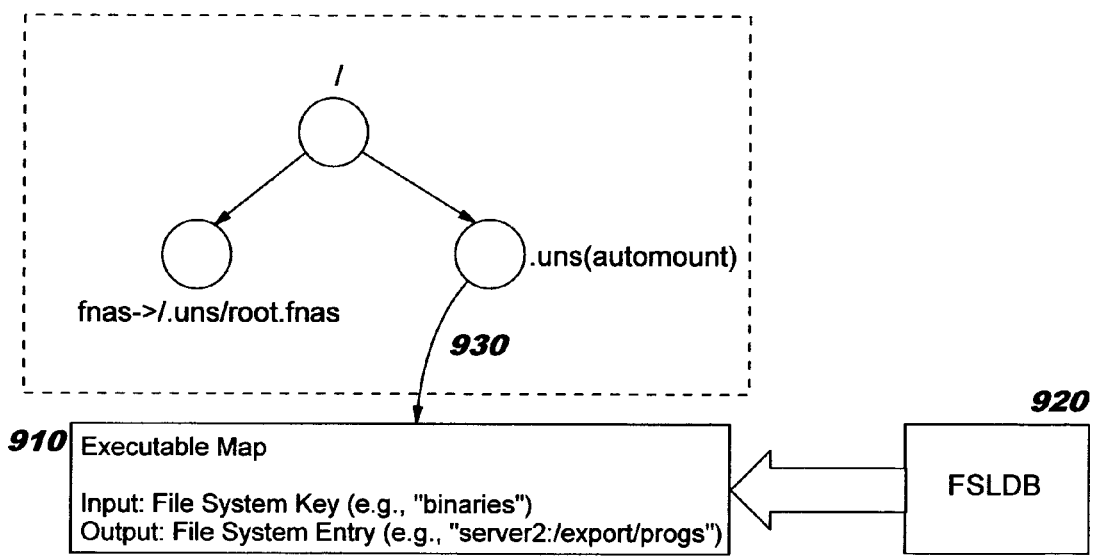
FIG. 9 illustrates an initial client-side configuration to be used by an automounter, according to preferred embodiments of the present invention.

Defining the automount directory, along with defining the special symlink for entry into this directory (i.e., the symlink "fnas->/.uns/root.nas", in the example used herein), yields the initial hierarchical client view 900 shown in FIG. 9. As shown therein, the root directory has two sub-directories. One sub-directory forms the base of the uniform namespace, as indicated by the special symlink at the left. The other sub-directory is the designated mount point directory (named ".uns", in the example used herein), which is shown at the right. The automounter should be configured to use the designated automount directory. Because of the association 930 of the automount directory "/.uns" with an executable program or map 910, the automounter knows that when it encounters this "/.uns" value as a component of a path name, it should access key-to-location mappings such as those depicted in table 700 of FIG. 7 (or a similar repository), represented in FIG. 9 as FSLDB 920. The access returns the appropriate parameters to enable the client to perform a mount operation. Thus, as shown in the example lookup in map 910, a reference to the object "bin" will return the file system entry "server2:/export/progs". (The symlink generated by the server associates "bin" with its stored key value "binaries", and this key value has the corresponding entry "server2:/export/progs" in the FSLDB.)

Whenever a client first accesses a reference (which may be entered, for example, via a command line entry or from a script file) of the form "/.uns/<filesystem>", where "<filesystem>" is a placeholder designating a file system name, the automounter will look up "<filesystem>" using an executable map, and will then mount the file system identified by the map. "Executable map" refers to a program that receives "<filesystem>" as an argument and returns the location of that file system (where this returned information is suitable for passing to the mount command). Using the examples shown in FIG. 7 and FIG. 9, the program would use "<filesystem>" as a key into a mapping table or FSLDB. As an alternative, an NIS+ indirect map might be used, where the content of this map is derived from the FSLDB. ("NIS+" maps are known in the art, and details of these maps are not deemed necessary to an understanding of the present invention.) Other types of maps might alternatively be used, such as an LDAP map of the type used by an "amd" automounter.

Figure 10A:
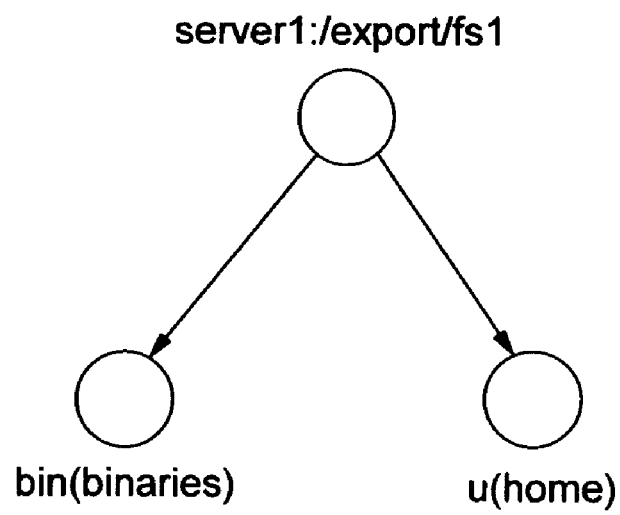
FIGS. 10A and 10B illustrate how a server exports its referral objects using symbolic links that are then resolved on the client, according to preferred embodiments of the present invention.
Figure 10B:
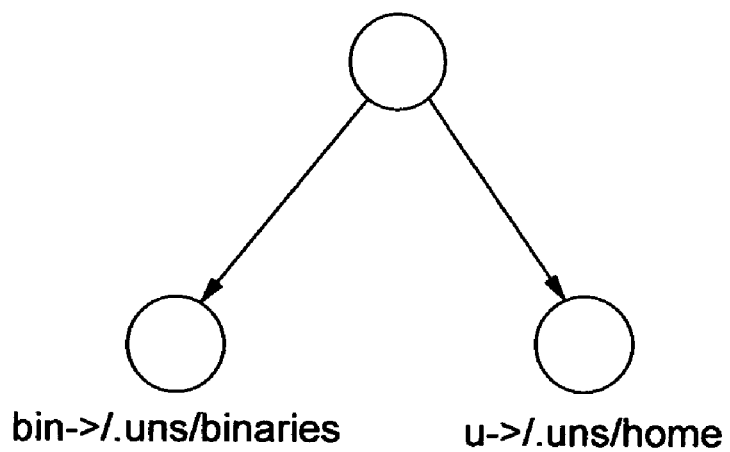

According to preferred embodiments, all file systems are exported on the server side. When a request arrives at a file system server, if the requested object is a file-system-resident referral object, the server will programmatically generate a symbolic link and return that symbolic link instead of the referral. This is illustrated pictorially in FIGS. 10A and 10B. As shown in the server-side view of FIG. 10A, server 1 exports a file system "fs1" which contains two referral objects. The client-side view of this file system, as returned to the client for resolution using the client's prior art automounter with sample symlinks, is shown in FIG. 10B. As shown in these figures, instead of the server returning the referral objects denoted by "bin" and "u" in FIG. 10A, or their content, denoted as "binaries" and "home" in FIG. 10A, the server generates and returns symlinks which associate "bin" with "/.uns/binaries" and "u" with "/.uns/home".

Figure 12:
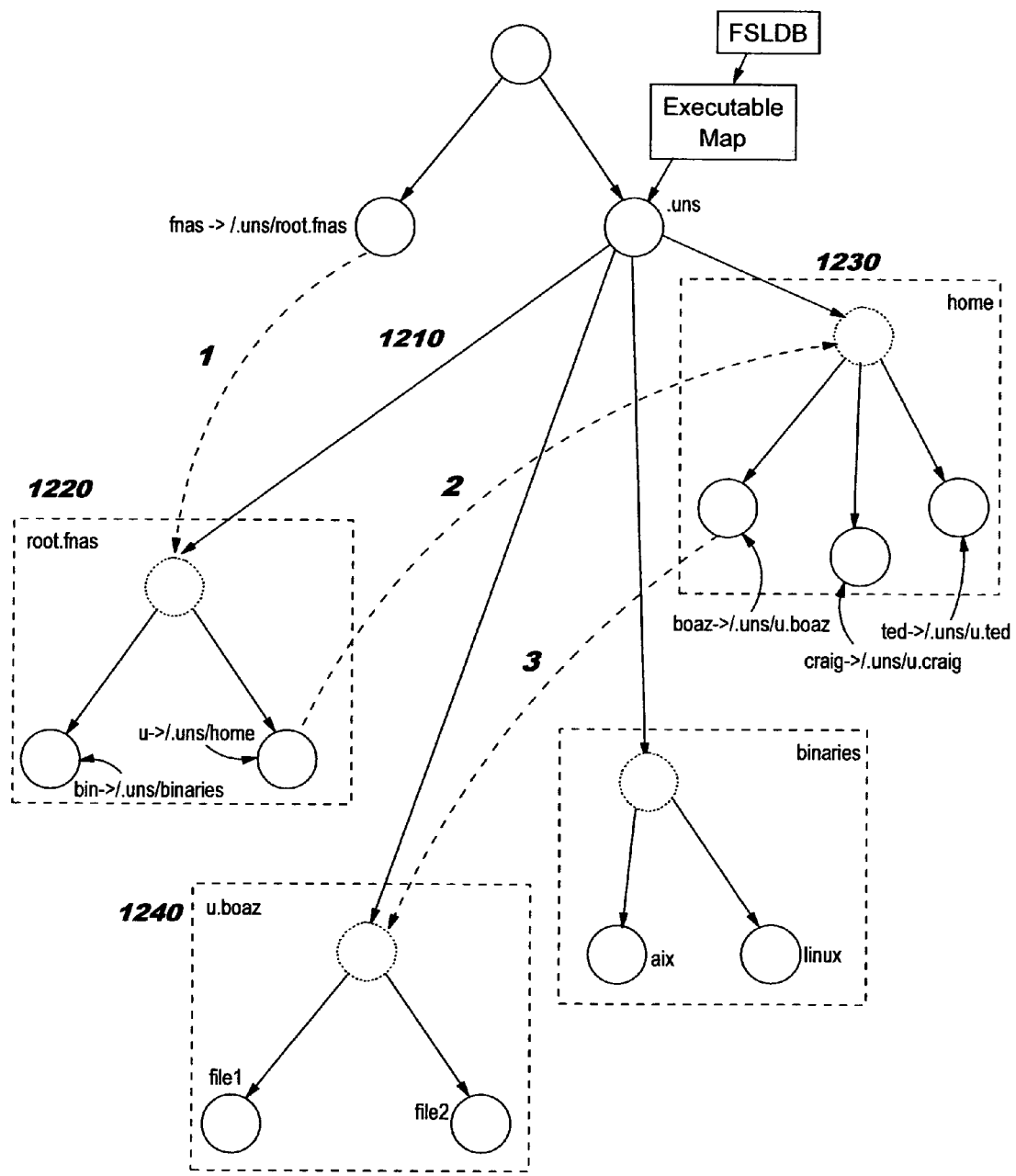

FIGS. 11 and 12 depict an example of resolving a file access, showing how a prior art automounter is leveraged to expand a reference using the symbolic links of the present invention to provide a client with a referral-style uniform name space view. In this example, the pathname provided from the client, and which is to be accessed using file access protocols, is /fnas/u/boaz/file1

See element 1100 of FIG. 11. As stated earlier, this access request might have been typed in at a command line prompt, or might have been read from a script file, and so forth. The client-side resolution of the path name begins by recognizing that "/fnas" is a symbolic link, which is to be expanded as "/.uns/root.fnas" (as shown at element 1110 of FIG. 11). The resulting path name 1110, where the symlink expansion is reflected, is then evaluated. Because new path components are present, these new components will be evaluated, and ".uns" at the top-most level of path name 1110 is determined to be a local directory. As stated earlier with reference to FIG. 9, because the automounter has been configured to recognize the ".uns" directory when it appears as a component of a path name, it will access key-to-location mappings to retrieve mount instructions. Accordingly, the next segment of the expanded path name, "root.fnas", is then evaluated, and the automounter knows that an automount operation should be performed for this reference. Using the executable map 910 to access the FSLDB 920 (which, for the example, contains the mappings illustrated in table 700), the automounter determines that the automount operation should send its mount request to server 1, using path name "/export/fs1". (See row 730 of table 700.) This is illustrated at step 1 and element 1220 of FIG. 12, which represents the symlink "fnas->/.uns/root.fnas" as a pointer to the referenced file system from server 1. To the client, after the automounter finishes, it will look like "/.uns/root.fnas" is a directory containing two entries, both of which are themselves symlinks in this example (as shown at element 1220). The mount operation invoked by the automounter results in server 1's file system being mounted in the ".uns" directory, as shown by arrow 1210.

Referring again to FIG. 11, having resolved an initial part of the input path name 1110, the remaining path name to be resolved is shown at 1120, and the next unresolved segment from this path name, "u", is then evaluated. In the example, a file access request for "u" will result in receiving another symbolic link from the server, because "u" is a referral object (see object 603 in FIG. 6A). The corresponding symlink is generated by the server and received by the automounter as "/.uns/home" (see element 1130 of FIG. 11). This expanded path segment is then processed by the automounter, which determines from the executable map that the location to be used for reference "home" is server 3 and path name "/export/users". (See row 750 of table 700, which associates "home" with this location and path.) Thus, server 3 is contacted, and returns its file system which is mounted in the ".uns" directory as shown at element 1230 and step 2 of FIG. 12.

Referring again to FIG. 11, having resolved "/.uns/home", the remaining unresolved path name is shown at 1140. The next segment of the input path name is then resolved, which in the example is "boaz". This appears to the client as a symlink to "/.uns/u.boaz", as shown in the expanded path name at 1150. The executable map is therefore invoked, and determines that this reference is to be mounted from server 4, using the path "/export/boaz". (See row 760 of table 700.) In response to contacting server 4, the requested file system is mounted in the ".uns" directory as shown at element 1240 and step 3 of FIG. 12.

Finally, referring again to the path name resolution scenario in FIG. 11, the last segment of the input path is "file 1", as shown at 1160. The client then looks up "/.uns/u.boaz/file1" and gets it attributes. This access operation indicates that "file1" is not a reference to a symbolic link. Thus, this is an actual file name, and no further expansions are required.

(Note that FIG. 12 shows an expansion for server 2's file system, as depicted in FIG. 6B. This expansion occurs, according to the example, when a reference is made to the "bin" referral object 602 of FIG. 6A and the mapping in row 740 of table 700 is accessed. Because the sample input in FIG. 11 does not include a reference to "bin", it may be assumed that this expansion occurred from another reference.)

Figure 13:
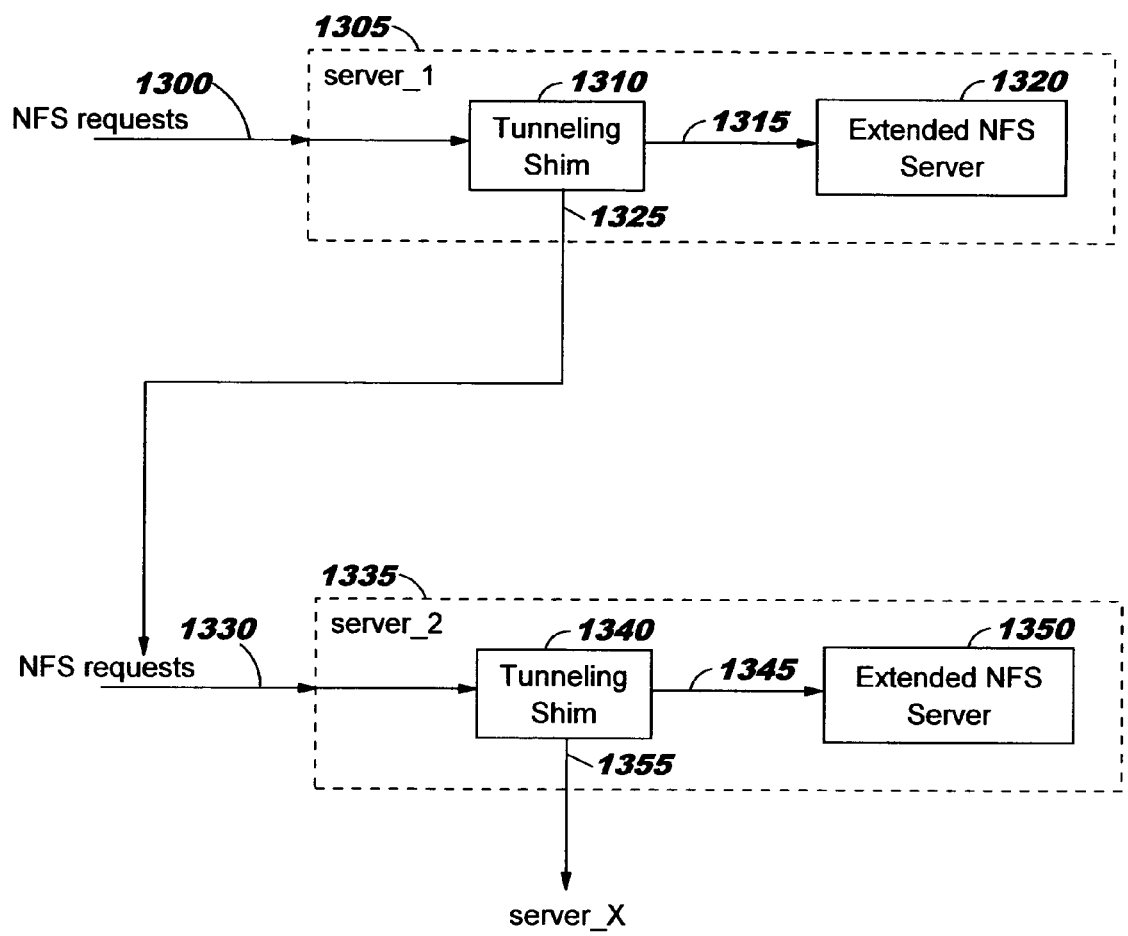
Figure 14:
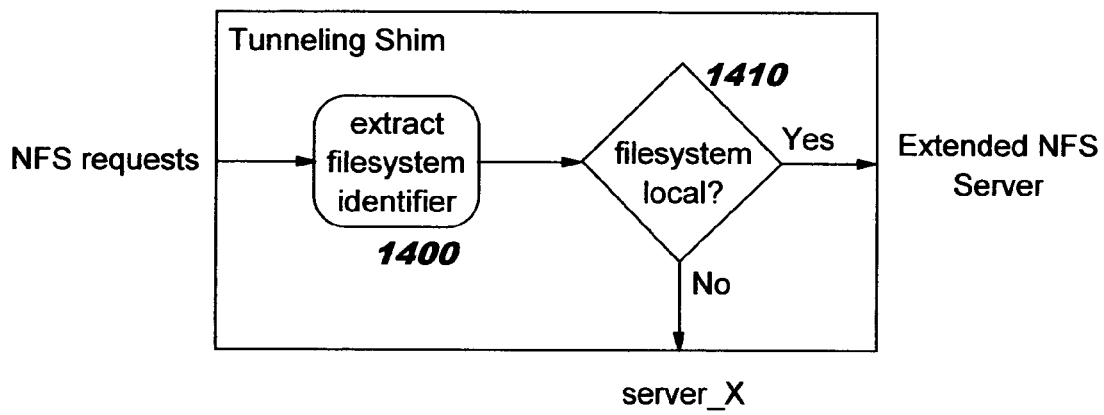
Figure 15:
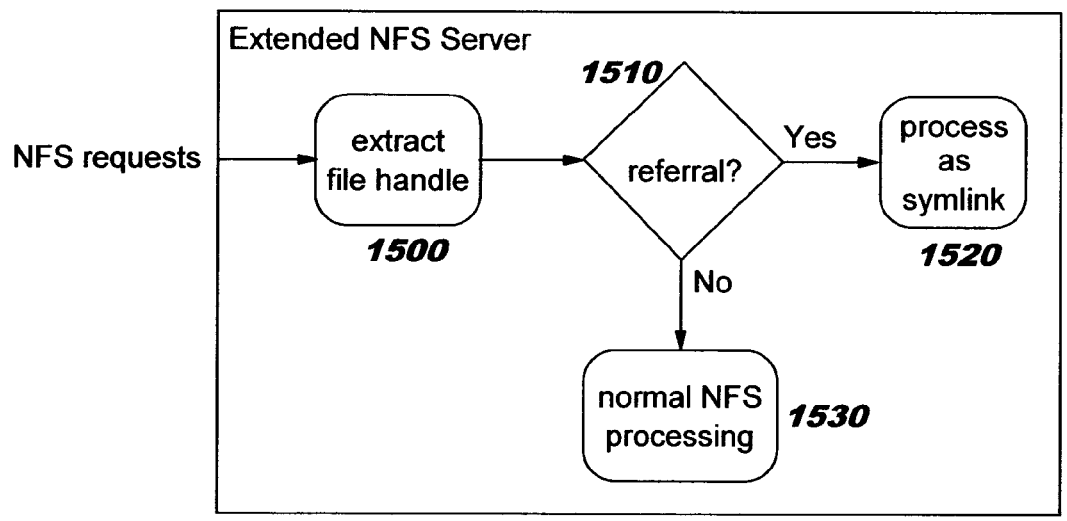

Referring now to FIGS. 13-16, flowcharts will be described which illustrate how preferred embodiments of the present invention may operate to provide the path name resolution and mounting operations represented by the examples in FIGS. 11 and 12. FIG. 13 illustrates the flow of incoming client requests, and FIGS. 14 and 15 provide a more detailed description of the processing that is being performed.

An incoming request, referred to in FIG. 13 by way of illustration as an NFS request 1300, arrives at a server denoted for illustrative purposes as "server_1" 1305. (References herein to use of the NFS protocol are for purposes of illustration and not of limitation. The inventive techniques disclosed herein may be used advantageously with other protocols as well.) A lightweight module, referred to in the figure as a "tunneling shim" 1310, is placed in front of the server's NFS daemon ("nfsd") and intercepts the incoming request. The tunneling shim then inspects the request to determine if it should stay on this server for processing or should instead be forwarded or tunneled to a different server. The former case is represented by transition 1315, where the "extended" NFS server 1320 receives the forwarded request. ("Extended" refers to the fact that the server has been extended, according to the techniques disclosed herein, to return symbolic links rather than referrals.) The latter case is represented by transition 1325, where the tunneling shim sends the inbound request to another server denoted as "server_2" 1335. (Preferably, transition 1325 corresponds to the tunneling shim forwarding the request to the server that can service the client's request. This approach results in less traffic than simply forwarding the request to a neighboring server or a randomly-selected server, which might then have to perform another forwarding operation. Note that this "flexible" forwarding approach has the benefit that the FSLDB accessed by the tunneling shim does not have to be absolutely current, but can occasionally contain "stale" location information. This relaxed requirement on the FSLDB considerably simplifies the shim implementation. For example, the shim can cache location information and only needs to re-validate its cache periodically.)

Server_2 may receive forwarded requests as well as requests that are sent directly from clients, as shown at 1330. Server_2 has its own tunneling shim 1340, which evaluates received requests to determine whether they should be forwarded 1345 to the local extended file server 1350 or should be tunneled 1355 to another server (identified for illustrative purposes as "server_X"). A similar process is preferably repeated on each server.

Operation of the tunneling shims 1310, 1340, responsive to receiving inbound requests 1300, 1330, is further illustrated in FIG. 14. As shown therein, the tunneling shim extracts the file system identifier from the inbound request (Block 1400). Preferably, this extraction is performed using techniques which are known in the art and which are used by file system servers. The shim then evaluates the extracted file system identifier (Block 1410) to determine whether the requested file system is locally available. File access requests include a file system identifier. If this determination has a positive result (i.e., this is the correct file server for serving this request), then the request is forwarded to the local file system server; otherwise, the request is tunneled to a different server.

As can be seen, the tunneling shim can very quickly inspect incoming requests and determine whether they can be passed through to the local server or need to be forwarded. Accordingly, operation of the tunneling shim adds very little overhead to servicing file access requests.

In addition to placing a tunneling shim in front of the file servers, when the file system uses the NFS protocol, similar shims are also preferably placed in front of the lock manager daemons (typically referred to as "lockd"), which service requests to lock files during I/O operations. Alternative embodiments may optionally place shims in front of the status monitor daemons (typically referred to as "statd") as well. (When using a different protocol, daemons providing analogous function to "lockd" and "statd" may be fronted by shims.)

Operation of extended NFS servers 1320, 1350, responsive to receiving the request forwarded at 1315, 1345, is further illustrated in FIG. 15. Upon receiving a request forwarded by the tunneling shim (Block 1500), the server extracts the file identification from the request. A determination is then made (Block 1510) as to whether the requested content is a file-system-resident referral. If so, then the server will convert the referral to a symlink (Block 1520) and returns that symlink to the requesting client. Otherwise, normal processing is used (Block 1530) to service the request.

Using the above-described techniques, clients will be able to navigate the uniform name space, starting from "/fnas" and moving deeper into the hierarchy as needed. Whenever a client tries to access a "/.uns/<filesystem>" reference (starting with "/.uns/root.fnas"), the automounter will automatically locate and mount the corresponding file system. (In an alternative embodiment, to eliminate a dependency on the "./uns" directory, the file servers can be configured to export symlinks using "/<xxx>/<filesystem>" syntax rather than "/.uns/<filesystem>", where <xxx> is a variable that depends on the specific requesting client.)

After a file system is moved, its new location attributes (including any replication information) will be determined the next time the client's automounter mounts the file system: it will retrieve the latest information from the FSLDB for use in determining the correct file system location. In this manner, recently-moved or replicated file systems will be accessible.

Preferred embodiments will leverage the automounter's normal timeout mechanism to unmount idle file systems, so that at any point in time, only recently active and in-use file systems will be mounted. By unmounting idle file systems, clients can maintain reasonably current mount information for each actively-used file system. When a file system moves, the tunneling shim forwards all traffic for that file system until each client's automounter gets a chance to unmount the file system (from the old location) and remount the file system (at the new location). It is expected that, within a relatively short period (such as an hour) after a move, most traffic will be going directly to the new server location, and after a few days have passed, only a very negligible amount of traffic (if any) will need to be tunneled.

Since the client uses symbolic links to connect referrals to their targets, mount points are not nested, and dependencies between nested mounts are therefore avoided.

Referring now to FIG. 16, the manner in which preferred embodiments enable a client to continue accessing a file system after it is moved or replicated will be described. As is known in the art, existing file access protocols have no means for a legacy client to query or otherwise re-evaluate the current location of an already-mounted file system to determine whether it is still accessible from the location known to this client. Instead, references to mounted file systems remain directed to the old server (i.e., the server where the content was previously stored). In preferred embodiments of the present invention, for simplicity, only the file content (and not state information of file server daemons such as lockd) is moved to the new server. The new server therefore knows nothing about what clients may have been accessing this content or which clients may have locks on that content. Losing track of lock states could allow applications to overwrite each other's data and/or see out-of-date versions of files. According to preferred embodiments, this undesirable situation is prevented by causing the old server to simulate a server crash. Crash recovery procedures are built into client implementations, according to the prior art, and comprise the client retrying its file access request until the server returns to service and the client receives a successful response to its request. The client's normal crash recovery procedures further comprise re-sending any unconfirmed operations (of which none should exist, since the crash is only simulated) and re-establishing any outstanding locks. (Note that this process is harmlessly redundant for file systems that have not moved, but for those that have, the old server's lock state is neatly transferred by the client to the new server.) Therefore, for a short grace period, the lock manager daemon on the new server will accept "reclaim" lock requests for files in the recently-arrived file system. During the retries, the tunneling shim will detect the content's new location (see the description of Block 1630, below), and a request will therefore automatically be forwarded to the new server. The successful response will therefore be returned by this server as well. When the old server is put back into service, requests for content still being served from that location will be handled as they normally would, while requests for the moved content will be transparently redirected to the new server.

Previous hosts of a moved file system must remain willing to tunnel requests indefinitely. Fortunately, the tunnel is basically stateless, and thus this requirement is easily satisfied. That is, whenever a request arrives for a file system that is not stored locally, the tunneling shim looks up the current address (e.g., in the FSLDB) and forwards the request to that host. Over time, clients will be rebooted (e.g., at the beginning of each new work day) and client automounters will unmount idle file systems. Subsequent requests for content will then be serviced using the updated FSLDB, so that tunneling for many requests is no longer required. It is anticipated that the number of references to moved file systems should decline to a trivial level within a few days.

To perform this transparent migration, the shim blocks all update traffic for a file system when a file system move operation begins (Block 1600). This ensures that the file system content is not changed during the migration process, while allowing read operations to continue during the data transfer. The contents are then moved to the new server (Block 1610), after which the shim temporarily blocks all traffic referencing that file system (Block 1620). The file system location data base is updated to reflect the content's new location (Block 1630). A simulated crash for the old server is then triggered (Block 1640). Preferably, this comprises sending SM_NOTIFY messages (or equivalent messages in other protocols), which inform client systems that the server has restarted, and, as mentioned above, the new server temporarily (i.e., until the end of the grace period) accepts lock reclaim requests from the clients that are carrying out crash recovery procedures for this content. The shim then allows all traffic for the moved file system to resume (Block 1650), and as described above, clients continue to access the moved content in a seamless manner. (The length of the grace period is not defined by file system protocol standards. Preferably, a configurable time interval is used, such as 45 seconds.)

An analogous process can be used for content that has been replicated. When file systems are replicated, the automounter map will provide a list of alternative locations. Failure of an in-use replication location can typically be handled by a client if the hard-mount crash recovery option is selected (whereby the client retries until receiving a successful response) with the read-only option turned on. However, changes in the replication attributes of a file system may result in a client being in active communication with a server that no longer hosts the file system; if all the other replicas are unavailable or have moved since the automounter last had a chance to look up the mount instructions, then the file system would be unavailable to this client. To avoid this problem, the approach described above with reference to FIG. 16 (and FIGS. 13-15) for read/write file systems that have moved can also be used for read-only replicas that have been deleted. That is, a crash can be simulated when the replica is to be deleted, and the shim will therefore automatically tunnel requests for the deleted replica to other locations where the file system is now hosted.

As a side effect, the simulated crash may trigger clients with access to file systems other than the moved replica to transfer to other servers. This is because the simulated crash will affect all file systems hosted by the "crashed" server, not just the file system that was moved. Clients actively using the server's other file systems will respond to even a brief outage by trying to use a different replica, if they know of one. The effect may be that all use of the "crashed" file server for would cease for file systems which are available from other servers as replicas. This is mitigated by the fact that the simulated crash process should execute very quickly, and that for clients that hold no locks (i.e., because replicas are read-only), the client may not notice that the server has crashed at all, unless a request was in progress (or in transit) during the simulated crash. Therefore, some clients may not attempt to transfer their access to other replicas. The few clients that continue to have existing mounts to the crashed server's now-deleted file system can be tunneled to another replica with very little processing overhead.

In an optional enhancement, only those clients currently holding locks on the moved file system will be sent the SM_NOTIFY messages. In another optional enhancement, the grace period may be lengthened or shortened adaptively, based on (for example) knowledge of what locks are currently held by clients. Use of either or both of these optional enhancements may serve to increase reliability and reduce delay in returning to full service operation.

As has been demonstrated, the present invention provides advantageous techniques for enabling clients to realize the advantages of file system referrals, even though the client does not operate proprietary or complex software that contains support for file system referrals. As explained above, the disclosed techniques allow clients to achieve a uniform name space view of content in a network file system, and to access content in a nearly seamless and transparent manner, even though the content may be dynamically moved from one location to another or replicated among multiple locations.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of simulating client-side file system referral capability, comprising:
   receiving, at a first file system server from a legacy client, a request for a file system, wherein the legacy client does not support referral file access protocol;
   determining, by the first file system server, that the requested file system is not stored at the first file system server but that the first file system server instead stores a referral for the requested file system, the referral comprising a key value uniquely associated with the requested file system;
   creating, by the first file system server responsive to the determining, a symbolic reference for the requested file system, the symbolic reference comprising the key value and a predetermined text string that signifies presence of the symbolic reference; and
   returning, from the first file system server to the legacy client as a response to the request, the symbolic reference instead of the requested file system, wherein presence of the predetermined text string in a path name component provided in the response thereby signals that client-side resolution is needed, the client-side resolution comprising accessing a client-side mapping that uniquely associates the key value with location information that identifies a location of the requested file system on a second file system server that is distinct from the first file system server.

2. The computer-implemented method according to claim 1, further comprising mounting the located file system on the legacy client.

3. The computer-implemented method according to claim 1, wherein the response is intercepted, at the legacy client, by a client-side automounter that performs the client-side resolution.

4. The computer-implemented method according to claim 3, further comprising mounting the located file system in an automounter directory on the legacy client.

5. The computer-implemented method according to claim 1, wherein the client-side resolution is performed by a client-side file locating component.

6. A computer-implemented method of simulating client-side file system referral capability, comprising:
   requesting, by a client, a file system from a first file system server, wherein the client does not support referral file access protocol;
   receiving, at the client from the first file system server as a response to the request, a symbolic reference for the requested file system instead of the requested file system, wherein the symbolic reference comprises a predetermined text string and a key value and was created at the first file system server responsive to a determination that the requested file system is not stored at the first file system server but that the first file system server instead stores a referral uniquely associated with the requested file system, the referral comprising the key value and the symbolic reference signalling that client-side resolution of the key value is needed; and responsive to detecting, at the client, the predetermined text string in a path name component provided in the received response, performing the client-side resolution by extracting the key value from the path name component and programmatically locating the requested file system using the extracted key value to retrieve location information for the requested file system from a key-to-location mapping that uniquely associates the key value with the location information.

responsive to detecting, the client, the predetermined text

7. The computer-implemented method according to claim 6, further comprising using the retrieved location information to mount the requested file system on the client.

8. The computer-implemented method according to claim 6, wherein:
the receiving further comprises intercepting the response, at the client, by a client-side automounter; and
the automounter performs the client-side resolution.

9. The computer-implemented method according to claim 8, further comprising using the retrieved location information to mount the requested file system in an automounter directory on the client.

10. The computer-implemented method according to claim 6, wherein the client-side resolution is performed by a client-side file locating component.

11. A system for simulating client-side file system referral capability, comprising:
a computer comprising a processor; and
instructions which execute using the processor to implement functions comprising:
receiving, at a first file system server from a legacy client, a request for a file system, wherein the legacy client does not support referral file access protocol;
determining, by the first file system server, that the requested file system is not stored at the first file system server but that the first file system server instead stores a referral for the requested file system, the referral comprising a key value uniquely associated with the requested file system;
creating, by the first file system server responsive to the determining, a symbolic reference for the requested file system, the symbolic reference comprising the key value and a predetermined text string that signifies presence of the symbolic reference; and
returning, from the first file system server to the legacy client as a response to the request, the symbolic reference instead of the requested file system, wherein presence of the predetermined text string in a path name component provided in the response thereby signals that client-side resolution is needed, the client-side resolution comprising accessing a client-side mapping that uniquely associates the key value with location information that identifies a location of the requested file system on a second file system server that is distinct from the first file system server.

12. The system according to claim 11, wherein the functions further comprise mounting the located file system on the legacy client.

13. The system according to claim 11, wherein the response is intercepted, at the legacy client, by a client-side automounter that performs the client-side resolution.

14. The system according to claim 13, wherein the instructions further comprise mounting the located file system in an automounter directory on the legacy client.

15. A system for simulating client-side file system referral capability, comprising:
a computer comprising a processor; and
instructions which execute using the processor to implement functions comprising:
requesting, by a client, a file system from a first file system server, wherein the client does not support referral file access protocol;
receiving, at the client from the first file system server as a response to the request, a symbolic reference for the requested file system instead of the requested file system, wherein the symbolic reference comprises a predetermined text string and a key value and was created at the first file system server responsive to a determination that the requested file system is not stored at the first file system server but that the first file system server instead stores a referral uniquely associated with the requested file system, the referral comprising the key value and the symbolic reference signalling that client-side resolution of the key value is needed; and
responsive to detecting, at the client, the predetermined text string in a path name component provided in the received response, performing the client-side resolution by extracting the key value from the path name component and programmatically locating the requested file system using the extracted key value to retrieve location information for the requested file system from a key-to-location mapping that uniquely associates the key value with the location information.

16. The system according to claim 15, wherein the instructions further comprise using the retrieved location information to mount the requested file system on the client.

17. The system according to claim 15, wherein:
the receiving further comprises intercepting the response, at the client, by a client-side automounter; and
the automounter performs the client-side resolution.

18. The system according to claim 17, wherein the instructions further comprise using the retrieved location information to mount the requested file system in an automounter directory on the client.

19. A computer program product for simulating client-side file system referral capability, the computer program product embodied on at least one computer-usable storage media and comprising computer-usable program code for:
receiving, at a first file system server from a legacy client, a request for a file system, wherein the legacy client does not support referral file access protocol;
determining, by the first file system server, that the requested file system is not stored at the first file system server but that the first file system server instead stores a referral for the requested file system, the referral comprising a key value uniquely associated with the requested file system;
creating, by the first file system server responsive to the determining, a symbolic reference for the requested file system, the symbolic reference comprising the key value and a predetermined text string that signifies presence of the symbolic reference; and
returning, from the first file system server to the legacy client as a response to the request, the symbolic reference instead of the requested file system, wherein presence of the predetermined text string in a path name component provided in the response thereby signals that client-side resolution is needed, the client-side resolution comprising accessing a client-side mapping that uniquely associates the key value with location information that identifies a location of the requested file system on a second file system server that is distinct from the first file system server.

20. The computer program product according to claim 19, further comprising computer-usable program code for mounting the located file system on the legacy client.

21. The computer program product according to claim 19, wherein the response is intercepted, at the legacy client, by a client-side automounter that performs the client-side resolution.

22. The computer program product according to claim 21, further comprising computer-usable program code for mounting the located file system in an automounter directory on the legacy client.

23. A computer program product for simulating client-side file system referral capability, the computer program product embodied on at least one computer-usable storage media and comprising computer-usable program code for:
  requesting, by a client, a file system from a first file system server, wherein the client does not support referral file access protocol;
  receiving, at the client from the first file system server as a response to the request, a symbolic reference for the requested file system instead of the requested file system, wherein the symbolic reference comprises a predetermined text string and a key value and was created at the first file system server responsive to a determination that the requested file system is not stored at the first file system server but that the first file system server instead stores a referral uniquely associated with the requested file system, the referral comprising the key value and the symbolic reference signalling that client-side resolution of the key value is needed; and
  responsive to detecting, at the client, the predetermined text string in a path name component provided in the received response, performing the client-side resolution by extracting the key value from the path name component and programmatically locating the requested file system using the extracted key value to retrieve location information for the requested file system from a key-to-location mapping that uniquely associates the key value with the location information.

24. The computer program product according to claim 23, further comprising computer-usable program code for using the retrieved location information to mount the requested file system on the client.

25. The computer program product according to claim 23, wherein:
  the receiving further comprises intercepting the response, at the client, by a client-side automounter; and
  the automounter performs the client-side resolution.

26. The computer program product according to claim 25, further comprising computer-usable program code for using the retrieved location information to mount the requested file system in an automounter directory on the client.

* * * * *